(12) United States Patent
Fryska et al.

(10) Patent No.: US 7,686,904 B2
(45) Date of Patent: Mar. 30, 2010

(54) CARBON FILAMENT IGNITION OF COMBUSTION SYNTHESIS MATERIALS

(75) Inventors: Slawomir T. Fryska, Granger, IN (US); Mark C. James, South Bend, IN (US); Mark L. LaForest, Granger, IN (US); Allen H. Simpson, Buchanan, MI (US); Barry P. Soos, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 351 days.

(21) Appl. No.: 11/583,922

(22) Filed: Oct. 20, 2006

(65) Prior Publication Data

US 2008/0093009 A1 Apr. 24, 2008

(51) Int. Cl.
*C03B 29/00* (2006.01)
*A61F 13/15* (2006.01)
*C04B 37/00* (2006.01)
*B27G 11/02* (2006.01)
*B32B 27/00* (2006.01)
*B29C 65/00* (2006.01)

(52) U.S. Cl. .................. 156/89.13; 156/89.11; 156/276; 156/325; 156/379.6; 156/379.8; 156/536; 156/537

(58) Field of Classification Search .............. 156/89.26, 156/89.13
See application file for complete search history.

(56) References Cited

U.S. PATENT DOCUMENTS

| | | | |
|---|---|---|---|
| 4,778,649 A * | 10/1988 | Niino et al. ............. 419/9 |
| 4,879,262 A | 11/1989 | Halverson et al. | |
| 5,139,594 A * | 8/1992 | Rabin .................. 156/89.25 |
| 5,143,184 A | 9/1992 | Snyder et al. | |
| 5,198,188 A | 3/1993 | Holt et al. | |
| 5,256,368 A | 10/1993 | Oden et al. | |
| 5,382,405 A * | 1/1995 | Lowrance et al. .......... 505/125 |
| 5,799,238 A | 8/1998 | Fisher, II et al. | |
| 5,972,157 A * | 10/1999 | Xue et al. ............... 156/285 |
| 6,022,505 A | 2/2000 | Rauscher et al. | |
| 6,174,605 B1 * | 1/2001 | Xue et al. ............... 428/408 |
| 6,203,897 B1 | 3/2001 | Koizumi et al. | |
| 6,521,152 B1 | 2/2003 | Wood et al. | |
| 6,676,887 B2 | 1/2004 | Lafdi | |
| 6,699,427 B2 | 3/2004 | Huang et al. | |

(Continued)

OTHER PUBLICATIONS

Mori et al., "Use of Carbon Fiber as Resistive Anode Wire for Position Sensitive Proportional Counter", Mar. 1986, Journal of Nuclear Science and Technology, 23[3], pp. 214-218.*

*Primary Examiner*—Philip C Tucker
*Assistant Examiner*—Alex Efta
(74) *Attorney, Agent, or Firm*—Birch, Stewart, Kolasch & Birch, LLP

(57) ABSTRACT

This invention generally pertains to self propagating high temperature synthesis or combustion synthesis as a way of bonding materials. The present invention provides methods and an apparatus for bonding, preferably carbon-carbon composite materials, by combustion synthesis. Generally, the invention involves providing at least two carbon-carbon composite parts to be bonded and interspersing a combustion synthesis material in between the parts with each part in contact with the combustion synthesis material. The combustion synthesis material is then ignited, which initiates the combustion synthesis reaction. Typically, a ceramic material is formed which immediately freezes, bonding the parts together.

3 Claims, 3 Drawing Sheets

U.S. PATENT DOCUMENTS

| | | |
|---|---|---|
| 6,723,193 B2 | 4/2004 | Martin |
| 6,855,428 B2 | 2/2005 | Lau et al. |
| 6,878,331 B2 | 4/2005 | Huang et al. |
| 6,955,532 B2 | 10/2005 | Zhu et al. |
| 2002/0031603 A1 | 3/2002 | Miyamoto et al. |
| 2003/0127212 A1 | 7/2003 | Kida et al. |
| 2003/0214064 A1 | 11/2003 | Shin et al. |
| 2004/0017019 A1 | 1/2004 | Huang et al. |
| 2004/0020176 A1 | 2/2004 | Kong |
| 2005/0142495 A1* | 6/2005 | Van Heerden et al. ........ 430/311 |
| 2006/0053760 A1 | 3/2006 | Kong |
| 2007/0017955 A1* | 1/2007 | Siracki et al. ................ 228/2.5 |
| 2007/0196666 A1* | 8/2007 | Tringe et al. ................ 428/420 |

* cited by examiner

CARBON FILAMENT IGNITION OF COMBUSTION SYNTHESIS MATERIALS

FIELD OF THE INVENTION

The field of this invention generally pertains to self propagating high temperature synthesis or combustion synthesis. More specifically, the invention relates to the use of combustion synthesis for the bonding of materials. The present invention provides methods and an apparatus for bonding, preferably carbon-carbon composite materials, by combustion synthesis.

BACKGROUND

Self propagating high temperature synthesis, or combustion synthesis, has become an important process for bonding materials. Typically a combustion synthesis material, possibly combined with other compounds is interspersed between two parts that are to be bonded together. The combustion reaction is initiated by heating the starting materials to their ignition temperature, whereupon combustion occurs and spreads throughout the combustion synthesis materials. Once initiated, the exothermic combustion reaction creates product material which ultimately binds the parts together.

For example, a high melting point ceramic may be formed from the combustion materials and the other compounds that are present, which quickly freezes binding the parts together. Advantages of combustion synthesis include high product purity and relative simplicity of the overall process. Refurbishment of carbon-carbon brake disks has been achieved by use of combustion synthesis to bond carbon-carbon materials.

A major problem in combustion synthesis is to uniformly heat the combustion agents when bonding large surface areas. This is necessary in order to create a combustion product that is entirely in the liquid phase at one moment in time. The problem has been approached in the past by applying large electrical energies to the parts being bonded. The current flows through both the combustible materials and the parts to be bonded, heating both until the ignition temperature is achieved.

Another method has been to heat both the materials to be bonded, and the combustion synthesis powder to above the ignition point of the powders. It is generally not necessary to heat the parts to be bonded to the ignition temperature, only the combustion synthesis materials used to create combustion products need to reach the ignition temperature. Nevertheless it has proven difficult to uniformly heat large areas to create a combustion product that is entirely in the liquid phase at once. Accordingly, there is a need in the art for improved methods of combustion synthesis which can uniformly and efficiently heat large areas to an ignition temperature.

SUMMARY OF THE INVENTION

The present invention relates to a method and apparatus for bonding materials by combustion synthesis. The method comprises providing two or more materials to be bonded with a combustion synthesis material placed between them. One or more carbon fibers are laid into the combustion synthesis material. Preferably the fibers are spaced evenly and parallel across the combustion synthesis material with no more than a few millimeters between parallel fibers. The fibers are connected to a voltage source. The voltage source should provide a voltage sufficient to heat the fibers rapidly. Preferably, the fibers are rapidly heated to about 2000° C. or higher. Force is then applied to join the parts during combustion. Force is maintained on the parts to be joined until the combustion reaction is complete and the product material freezes.

This invention provides the significant advantage that the energy that would typically be required to heat the fibers would be on the order of about 200 watts at less than 100 volts. This should be compared to the approximately 150,000 watts that is generally required to rapidly heat and initiate combustion in full scale parts. Accordingly, a significant energy savings can be obtained in addition to a more uniform heating and ignition of the combustible materials.

This invention also provides an apparatus for bonding materials by combustion synthesis. The apparatus includes carbon fiber filaments which are connected at each end to a voltage source and is the means for heating the combustion synthesis material. The means for pre-heating the parts and combustion synthesis material may be any of the means generally known and used in the art for combustion synthesis, and would include electrically heating the parts and combustion synthesis material, and convection heating. Pre-heating may slow the freezing rate making a stronger bond.

DETAILED DESCRIPTION OF THE INVENTION

Figure 1:
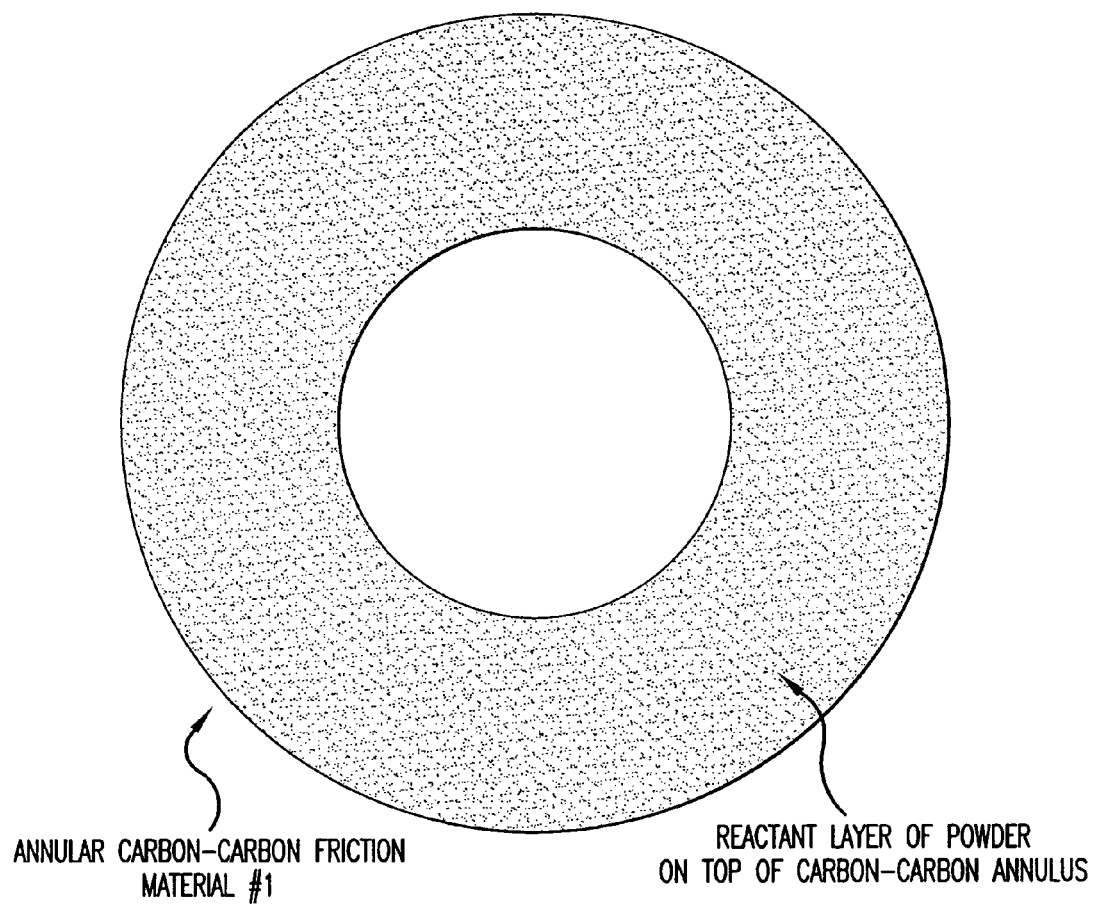
FIG. 1 shows a top view of one embodiment of the present invention.

The present invention relates to a method and apparatus for bonding materials by combustion synthesis. The invention comprises providing two or more materials to be bonded with a combustion synthesis material interspersed between them. One or more carbon fibers are laid into the combustion synthesis material. Preferably the fibers are spaced evenly and parallel across the combustion synthesis material with no more than a few millimeters between parallel fibers. The fibers are connected to a voltage source. The voltage source should provide a voltage sufficient to heat the fibers rapidly. Typical voltages would be about 100 volts. Preferably, the fibers are rapidly heated to about 2000° C. or higher. The heating is performed until ignition of the combustion synthesis material occurs.

Combustion synthesis materials. The combustion synthesis materials that are used with this invention can be any that are typically known and used in the art for combustion synthesis. Preferably, the product of the combustion synthesis reaction will be a ceramic. Preferably, the combustion synthesis materials consist of a finely ground metal and a finely ground material capable of oxidizing the metal. In a highly preferred embodiment the mixture will form titanium carbide after reaction.

Carbon fibers. The carbon fibers that can be used with this invention are not particularly limited. The carbon fibers which can be used in this invention are usually produced by pyrolysis of an organic precursor fiber in an inert atmosphere at high temperature. The carbon fibers may also be used in the form of carbon fiber bundles of two or more carbon fibers. Preferably, the carbon fibers have a diameter between about 3 and 100 microns and are spaced about 10 mm apart or less. More highly preferred the carbon fibers have a diameter between about 5 and 20 microns. Even more highly preferred the carbon fibers have a diameter between about 9 and 12 microns. More highly preferred the carbon fibers are spaced between about 3 and 8 mm apart. Even more preferably the carbon fibers are spaced between about 4 and 6 mm apart.

Carbon fibers may be produced from different types of materials known as precursor fibers, such as polyacrylonitrile (PAN), rayon, and petroleum pitch. Carbon fibers are typically produced by the pyrolytic scission of the oxygen, nitrogen, and other non-carbon fractions of the precursor fiber, leaving only carbon in the fiber. Following this reducing step, the fibers are typically heat-treated in a furnace to produce fibers with the desired state of graphitization. Carbon fibers are produced at furnace temperatures of typically around 1,000-2,000° C.

Carbon-carbon composites. Any carbon carbon-carbon composites that are known in the art can be used with this invention. Preferably the carbon-carbon composites are those that would typically be used in friction material for brakes, more preferably aircraft brakes. Carbon-carbon composites are generally made of carbon fibers, and a carbon matrix. Carbon-carbon composites and methods of their manufacture are well known to those in the art. Carbon-carbon composites are described, for example, in Carbon-Carbon Materials and Composites, John D. Buckley and Dan D. Edie, Noyes Publications, 1993, which is incorporated herein by reference. The carbon-carbon composites of the present invention can be made with thermosetting resins as matrix precursors. These materials generally possess low densities 1.55-1.75 g/cm$^3$ and have well-distributed microporosity. Composites made with resins as the matrix generally exhibit high flexural strength, low toughness, and low thermal conductivity.

The carbon-carbon composites of the present invention can also be made with pitch as the matrix precursor. These materials, after densification, can exhibit densities in the range of 1.7-2.0 g/cm$^3$ with some mesopores. The carbon-carbon composites of the present invention can also be made by chemical vapor deposition (CVD). This technique uses hydrocarbon gases, and the carbon-carbon composites that are produced possess intermediate densities, and have matrices with closed porosities. Composites with pitch as the precursor, and the CVD-based composites, can be made with very high thermal conductivity (about 400-700 W/MK) in the fiber direction.

In one preferred embodiment, the carbon-carbon composites of the present invention are prepared from carbon preforms. Carbon preforms are made of carbon fibers, which can be formed from pre-oxidized acrylonitrile resin. The carbon fibers can be layered together to form a shape, such as a friction brake annular disc. The shape is heated and infiltrated with methane, or another pyrolyzable carbon source, to form the carbon-carbon composite. A carbon-carbon composite prepared in this manner is preferred, and will have a density in the range of about 1.6 g/cm3 to about 1.9 g/cm3. More highly preferred is a carbon-carbon composite with a density of approximately 1.75 g/cm3.

One highly preferred carbon-carbon composite is CARBENIX® 4000. This carbon/carbon composite material is manufactured by Honeywell International, Inc. as an aircraft brake carbon/carbon composite friction material. CARBENIX® 4000 is made of non-woven polyacrylonitrile precursor carbon fibers, densified with carbon utilizing chemical vapor deposition.

Another highly preferred carbon-carbon composite is CARBENIX® 2400, also manufactured by Honeywell International, Inc. CARBENIX® 2400 is an aircraft brake carbon/carbon composite friction material, consisting of pitch precursor carbon fibers, densified with carbonized phenolic resin and with carbon from chemical vapor deposition.

Heating methods. Methods of heating the parts to be bonded include any that would typically be known in the art for heating parts in combustion synthesis. Electrical heating methods are preferred. Heating in a conventional furnace may also be used. Heating is generally performed under an non reactive gas such as nitrogen or argon.

Figure 2:
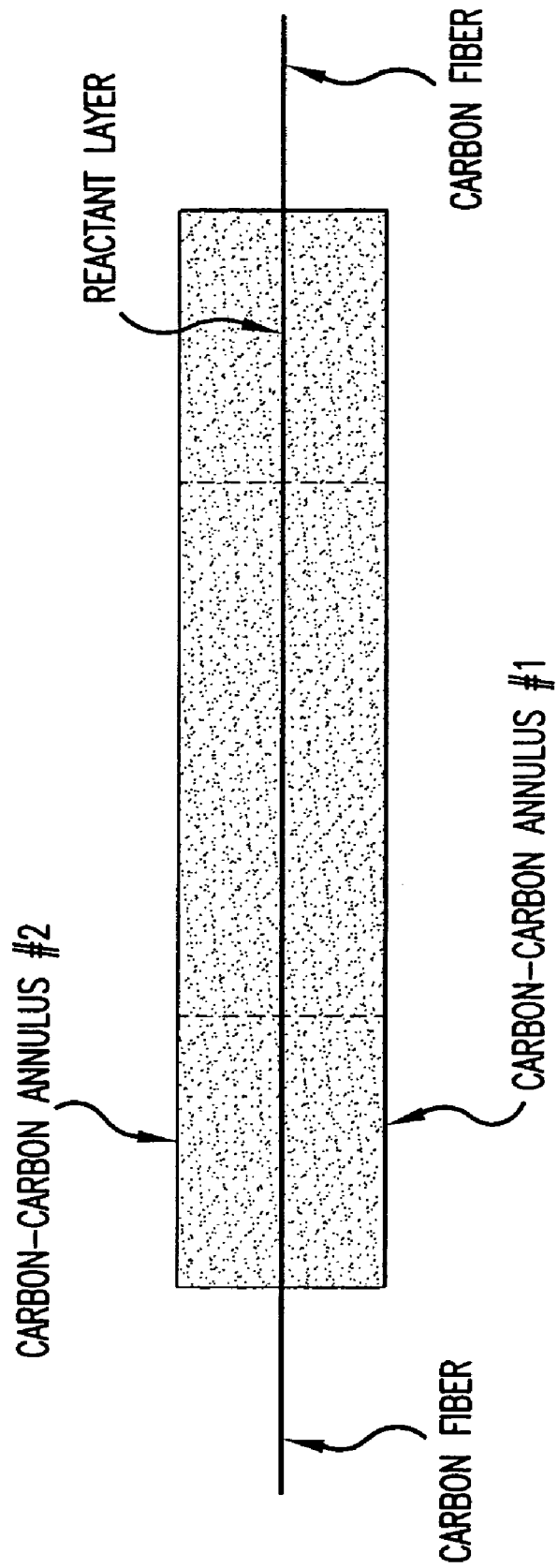
FIG. 2 shows a side view of one embodiment of the present invention, including a carbon-carbon annulus stack, a reactant layer, and a carbon fiber.
Figure 3:
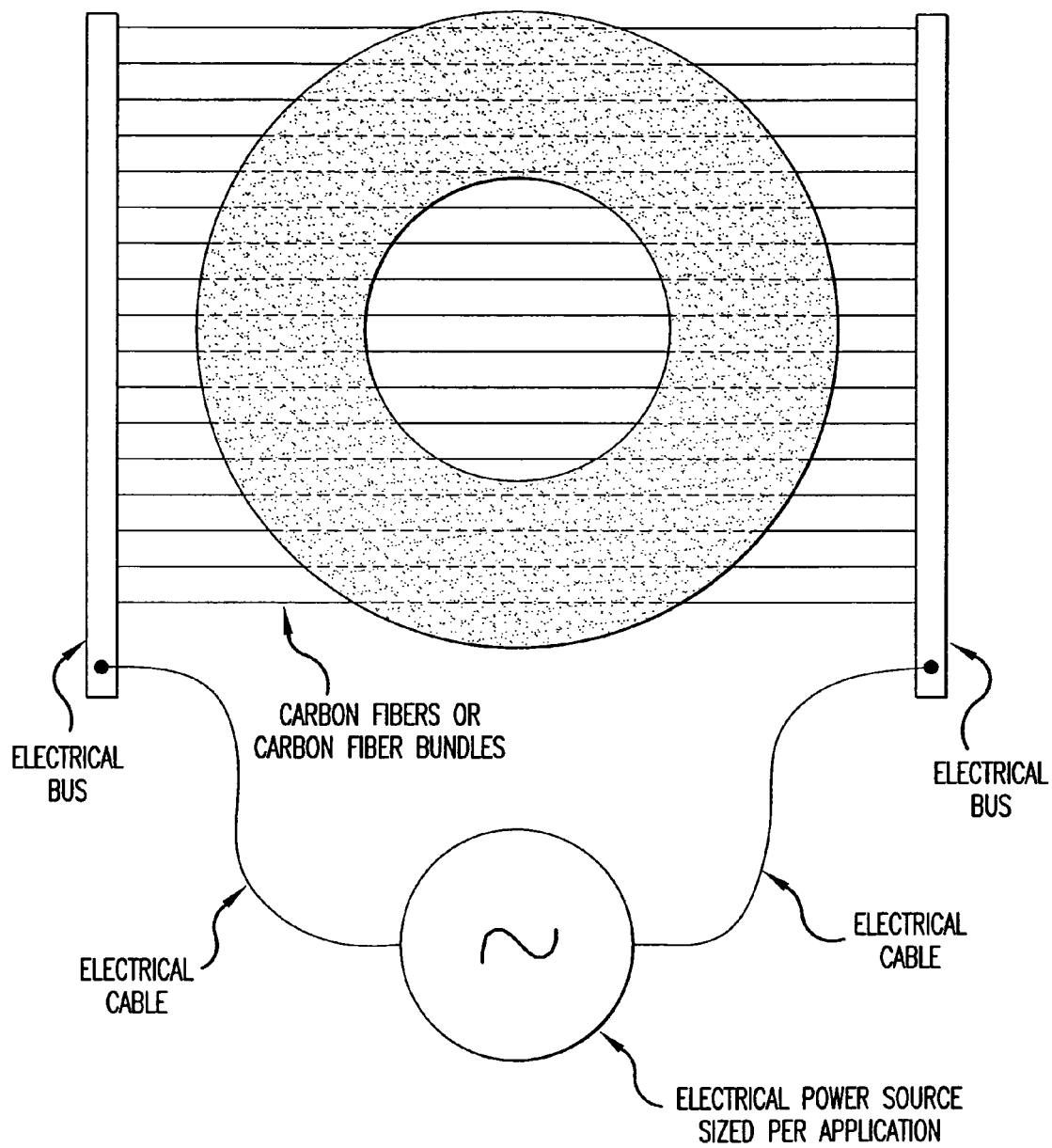
FIG. 3 shows the top of the carbon-carbon stack from FIG. 2, with carbon fibers, a reactant layer, and an electrical power source with cables.

Combustion synthesis apparatus. One embodiment of a combustion synthesis apparatus in accord with the present invention is shown in FIGS. 1, 2, and 3. FIG. 1 is a top view and shows a reactant layer of powder placed on top of an annular carbon-carbon friction material. FIG. 2 shows a side view of the apparatus. The carbon parts in FIG. 2 may also be placed into a mechanical press which squeezes the parts together with an appropriate amount of force for the duration of the chemical reaction. FIG. 3 shows the top of the carbon-carbon stack from FIG. 2 with a reactant layer and carbon fibers or carbon fiber bundles. The carbon fibers or carbon fiber bundles are connected to an electrical bus, which in turn is connected through electrical cables, which connect the electrical bus to an electrical power source. The electrical power source would be sized to meet the needs of a particular application.

Preferred embodiment. The surfaces of the parts to be bonded are first prepared. The surfaces are ground smooth or other mating surfaces are created. The Combustion Synthesis materials are then prepared. The combustion synthesis materials consist of a finely ground metal and a finely ground material capable of oxidizing the metal. The preferred mixture will form titanium carbide. These are mixed in stoichiometric or non-stoichiometric quantities and the powder is placed on the surface of one of the parts to be bonded. The mating part is then placed on top of the powder.

Multiple carbon fibers are laid into the powder mixture before the mating piece is placed onto the powder. The fibers have a diameter of between about 3 and 100 microns. They are spaced evenly and parallel across the powder with no more than about 6 millimeters between parallel fibers. The fibers are then connected to a voltage source at each end sufficient to heat the fibers rapidly to over approximately 2000° C. Force is then applied to join the parts during combustion. Once initiated throughout the powder layer, the energy created by the combustion itself is sufficient to complete the combustion reaction and the bonding process.

The powder is then ignited. The entire load of powder is ignited within about 1 second so that all of the combustion synthesis material is liquid at the same time. This may be done by heating the entire assembly to above the ignition point of the powder mixture. For titanium carbide this is over approximately 1500° C. While the material is in the liquid phase, the parts are pressed together. The melting point of the resulting titanium carbide is very high, i.e., over approximately 2500° C. The liquid titanium carbide then quickly freezes bonding the carbon-carbon parts together.

The preferred embodiments given above are only examples of the invention, and are not intended to define the full scope of the invention. One skilled in the art would recognize many variations of this invention that are also intended to be encompassed by the claims.

We claim:

1. A method for bonding carbon-carbon composite materials comprising:
   placing at least two carbon-carbon composite parts to be bonded in close proximity with each other;
   placing a combustion synthesis material consisting of a finely ground metal and a finely ground material capable of oxidizing the metal in between the parts to be bonded, and in contact with each part to be bonded;

placing two or more carbon fibers or carbon fiber bundles connected to a voltage source in contact with the combustion synthesis material, wherein the carbon fibers have a diameter between 3 and 100 microns and wherein the two or more carbon fibers or carbon fiber bundles are spaced evenly and parallel to one another 10 mm apart or less; and igniting the combustion synthesis material by applying thereto, through said carbon fibers or carbon fiber bundles, energy of about 200 watts at less than 100 volts, wherein a combustion synthesis reaction occurs upon ignition.

2. The method of claim 1, wherein the two or more carbon fibers are spaced between about 4 and 6 mm apart.

3. The method of claim 1, wherein the combustion synthesis material produces a titanium carbide after reaction.

* * * * *